United States Patent
Yun

(10) Patent No.: US 6,934,613 B2
(45) Date of Patent: Aug. 23, 2005

(54) AUTOMATED SELF-CONTROL TRAVELING SYSTEM FOR EXPRESSWAYS AND METHOD FOR CONTROLLING THE SAME

(75) Inventor: Jung-Rak Yun, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/716,741

(22) Filed: Nov. 17, 2003

(65) Prior Publication Data

US 2004/0215377 A1 Oct. 28, 2004

(30) Foreign Application Priority Data

Apr. 22, 2003 (KR) .................. 10-2003-0025345

(51) Int. Cl.⁷ .................. G06F 17/00; B62D 6/00; B62D 5/04; B60T 7/12
(52) U.S. Cl. .................. 701/41; 701/23; 701/25; 701/41; 701/51; 701/201
(58) Field of Search .................. 701/28, 19, 20, 701/22–25, 51–93, 96, 206, 120–121, 207, 223, 41, 201; 180/6.2, 204, 337; G06F 17/00

(56) References Cited

U.S. PATENT DOCUMENTS

| | | | | |
|---|---|---|---|---|
| 5,229,941 A | * | 7/1993 | Hattori | 701/26 |
| 5,396,426 A | * | 3/1995 | Hibino et al. | 701/96 |
| 5,467,284 A | * | 11/1995 | Yoshioka et al. | 701/301 |
| 5,537,414 A | * | 7/1996 | Takiyasu et al. | 370/347 |

(Continued)

FOREIGN PATENT DOCUMENTS

| | | | | |
|---|---|---|---|---|
| DE | 4325264 C1 | * | 10/1994 | H02J/13/00 |
| EP | 1076276 A1 | * | 2/2001 | G05D/1/02 |
| EP | 1176392 A1 | * | 1/2002 | G01C/21/26 |
| JP | 55063997 A | * | 5/1980 | B63H/25/04 |
| JP | 57094809 A | * | 6/1982 | G05D/1/02 |
| JP | 57175497 A | * | 10/1982 | B63H/25/04 |
| JP | 60014305 A | * | 1/1985 | G05D/1/02 |
| JP | 62189512 A | * | 8/1987 | G05D/1/02 |
| JP | 02278313 A | * | 11/1990 | G05D/1/10 |
| JP | 03262769 A | * | 11/1991 | B61B/13/10 |
| JP | 06266433 A | * | 9/1994 | G05D/1/02 |
| JP | 07031208 A | * | 2/1995 | A01B/69/00 |
| JP | 09058503 A | * | 3/1997 | B62D/6/00 |
| JP | PCT/JP98/05438 | * | 12/1998 | G06F/7/00 |
| JP | 2000272530 A | * | 10/2000 | B62D/6/00 |
| JP | 2001018770 A | * | 1/2001 | B60T/7/12 |
| JP | 2002255057 A | * | 9/2002 | B62D/11/10 |
| JP | 2004203117 A | * | 7/2004 | B62D/6/00 |
| WO | WO 9846065 A1 | * | 10/1998 | A01D/75/28 |

OTHER PUBLICATIONS

Donovan et al., Aircraft surveillance and recording system includes ground recording station that receives signals retransmitted from global positioning station and stores signals in ground station, DERWENT–ACC–NO: 2003–677730, Jun. 17, 2003.*

*Primary Examiner*—Cuong Nguyen
(74) *Attorney, Agent, or Firm*—Morgan Lewis & Bockius LLP

(57) ABSTRACT

A self-control traveling system for an expressway and a method for controlling the same is disclosed. A plurality of road signs are consecutively installed at left and right sides of the expressway. An imaging device images the road signs arranged along the expressway. An image processor analyzes at least one image, discriminates the roadside signs and reads sign contents contained in the roadside signs. A navigation database stores map information of the expressway. An artificial intelligence-electronic control unit determines a current position and a road state on the basis of the map information stored in the navigation database and the sign contents read by the image processor. An integrated ECU controls a steering operation, a speed decrement/increment operation and others associated with the self-control traveling operation according to a result of the determination.

2 Claims, 3 Drawing Sheets

U.S. PATENT DOCUMENTS

| | | | | |
|---|---|---|---|---|
| 5,594,413 A | * | 1/1997 | Cho et al. | 340/435 |
| 5,610,815 A | * | 3/1997 | Gudat et al. | 701/23 |
| 5,684,696 A | * | 11/1997 | Rao et al. | 701/25 |
| 5,878,362 A | * | 3/1999 | Sekine et al. | 701/41 |
| 5,925,080 A | * | 7/1999 | Shimbara et al. | 701/23 |
| 5,938,707 A | * | 8/1999 | Uehara | 701/41 |
| 5,957,983 A | * | 9/1999 | Tominaga | 701/23 |
| 5,999,092 A | * | 12/1999 | Smith et al. | 340/436 |
| 6,115,652 A | * | 9/2000 | Sato et al. | 701/28 |
| 6,151,539 A | * | 11/2000 | Bergholz et al. | 701/25 |
| 6,182,000 B1 | * | 1/2001 | Ohta et al. | 701/55 |
| 6,199,001 B1 | * | 3/2001 | Ohta et al. | 701/51 |
| 6,249,720 B1 | * | 6/2001 | Kubota et al. | 701/1 |
| 6,370,471 B1 | * | 4/2002 | Lohner et al. | 701/96 |
| 6,484,077 B1 | * | 11/2002 | Unose et al. | 701/24 |
| 6,591,172 B2 | * | 7/2003 | Oda et al. | 701/23 |
| 6,622,079 B2 | * | 9/2003 | Minowa et al. | 701/96 |
| 2001/0034575 A1 | * | 10/2001 | Takenaga et al. | |
| 2002/0019703 A1 | | 2/2002 | Levine | |
| 2002/0095255 A1 | * | 7/2002 | Minowa et al. | |
| 2002/0169528 A1 | * | 11/2002 | How | |

* cited by examiner

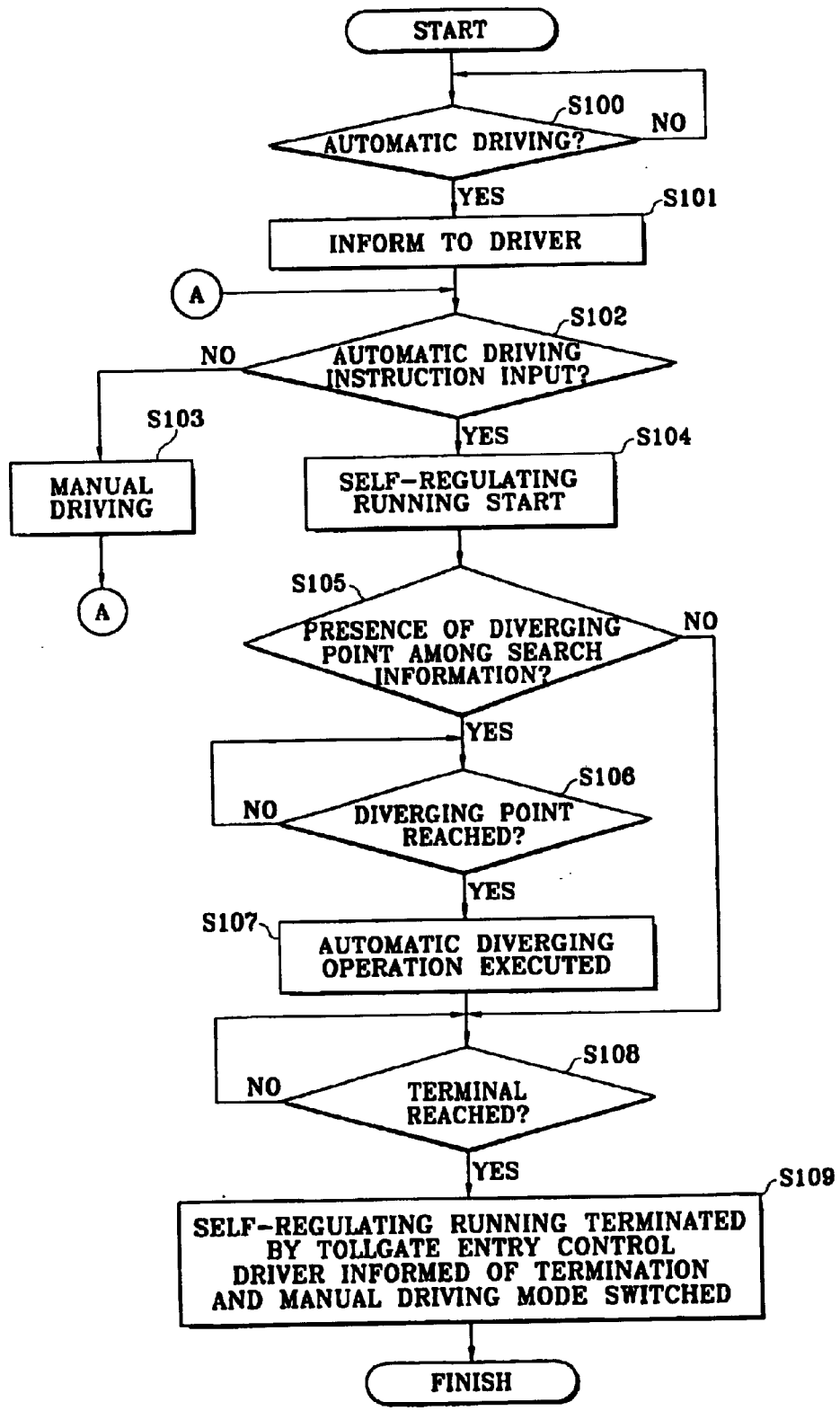

AUTOMATED SELF-CONTROL TRAVELING SYSTEM FOR EXPRESSWAYS AND METHOD FOR CONTROLLING THE SAME

CROSS-REFERENCE TO RELATED APPLICATIONS

This application claims priority of Korean Application No. 10-2003-0025345, filed on Apr. 22, 2003, the disclosure of which is incorporated fully herein by reference.

FIELD OF THE INVENTION

The present invention relates to an automated self-control traveling system for an expressway and a method for controlling the same and, more particularly, to a system and method for implementing an automated navigation control operation by enabling a vehicle to discriminate road information associated with a stating point, a turning point, etc., and by using a road infrastructure in vehicle-dedicated roads such as expressways and image recognition technology.

BACKGROUND OF THE INVENTION

Various driver-support systems have been implemented in vehicles to protect drivers and passengers, assist the driver in the vehicle and improve the ride of the vehicle. Recently, there has been further advancement of this technology to help improve and develop these driver-support systems.

Technology for recognizing traffic lanes via a vision sensor (e.g., a camera) and performing an automatic steering operation has been practical use. Conventionally, an image recognition/processing device detects and provides image information associated with the vehicle environment within the traffic lanes, the left and right sides of the traffic lanes, and other moving vehicles within the lanes to enable a display unit to display the image information so that the drivers can conveniently recognize the traffic lanes, traffic status and movement information of peripheral vehicles though the displayed information.

On the other hand, a starting point, route and turning point in an expressway cannot be determined by an automobile if the automobile does not have highly advanced artificial intelligence. Thus, research on technology for combining an automatic traveling operation with a global positioning system (GPS), a communication function between on-road vehicles using local area communications and a telematics function is ongoing. There is a problem in that the reliability of conventional systems is not completely assured and hence errors in conventional systems are still present.

SUMMARY OF THE INVENTION

Embodiments of the present invention provide a system and method which can obtain and discriminate road information associated with a stating point, a turning point, etc., using an imaging device such as a charge coupled device (CCD) camera rather than a global positioning system (GPS) or local area communication system and hence implement a self-control traveling operation.

In accordance with a preferred embodiment of the present invention, a self-control traveling system for an expressway comprises a plurality of road signs consecutively installed at left and right sides of the expressway and a charge coupled device (CCD) camera for photographing the road signs arranged along the traveling direction. Image processing means analyze at least one image inputted from the CCD camera, discriminating the road signs and reading the contents contained in the road signs. Storage means store map information of the expressway. Determination means determine a current position and a road state on the basis of the map information stored in the storage means and the sign contents read by the image processing means. Control means control a steering, operation, a speed decrement/increment operation and others associated with the self-control traveling operation according to a result of the determination.

In accordance with another embodiment of the present invention, a method for controlling a self-control traveling system for an expressway comprises (a) determining whether at least one image received from an imaging device contains information indicating a starting point for enabling a self-control traveling operation; (b) determining whether a self-control traveling command is inputted according to a result of the determination in step (a), switching from a manual driving mode to an automatic driving mode, requesting that destination information be inputted, and starting the self-control traveling operation; (c) searching for corresponding map information associated with the inputted destination information when the self-control traveling operation is started, determining whether a turning point is indicated in the searched map information, and performing the self-control traveling operation according to a result of the determination; (d) determining whether turning-point information is inputted among input image information during the self-control traveling operation; (e) controlling an automatic turning operation or determining whether an automobile has arrived at an end point according to a result of the determination in step (d); and (f) switching from automatic driving mode to manual driving mode according to a result of the determination in step (e), and termination the self-control traveling operation.

In a further alternative embodiment, a self-control traveling system is designed for use on a roadway including a plurality of road signs installed along sides of the roadway. Such a system may comprise plural processors and memory communicating with an imaging device configured to generate images of the road signs. Preferably, an image processor is programmed to analyze images received from the imaging device, with the analysis including discriminating and reading road sign content. The memory is preferably configured as a date of roadway map information. A status processor is programmed to determine current position and road state based on roadway map information received from the memory and road sign analysis received from the image processor. A control processor is programmed to effect vehicle self-control based on the current position and road state received from the status processor. In a further preferred embodiment, the image processor, status processor and control processor comprise modules of a common processing means.

In another embodiment, the system may further comprise a steering controller, a throttle controller, a brake controller and a transmission controller, wherein the controllers each communicate with the control processor to effect vehicle self-control. Vehicle self-control may comprise at least control of steering and speed by the control processor through at least the steering.

BRIEF DESCRIPTION OF THE DRAWINGS

The above and other objects, features and other advantages of the present invention will be more clearly understood from the following detailed description taken in conjunction with the accompanying drawings, in which:

FIG. 3 is a flowchart illustrating a method for controlling the self-control traveling system.

DETAILED DESCRIPTION OF THE PREFERRED EMBODIMENTS

The preferred embodiments of the present invention will now be described in detail with reference to the annexed drawings.

Figure 1:
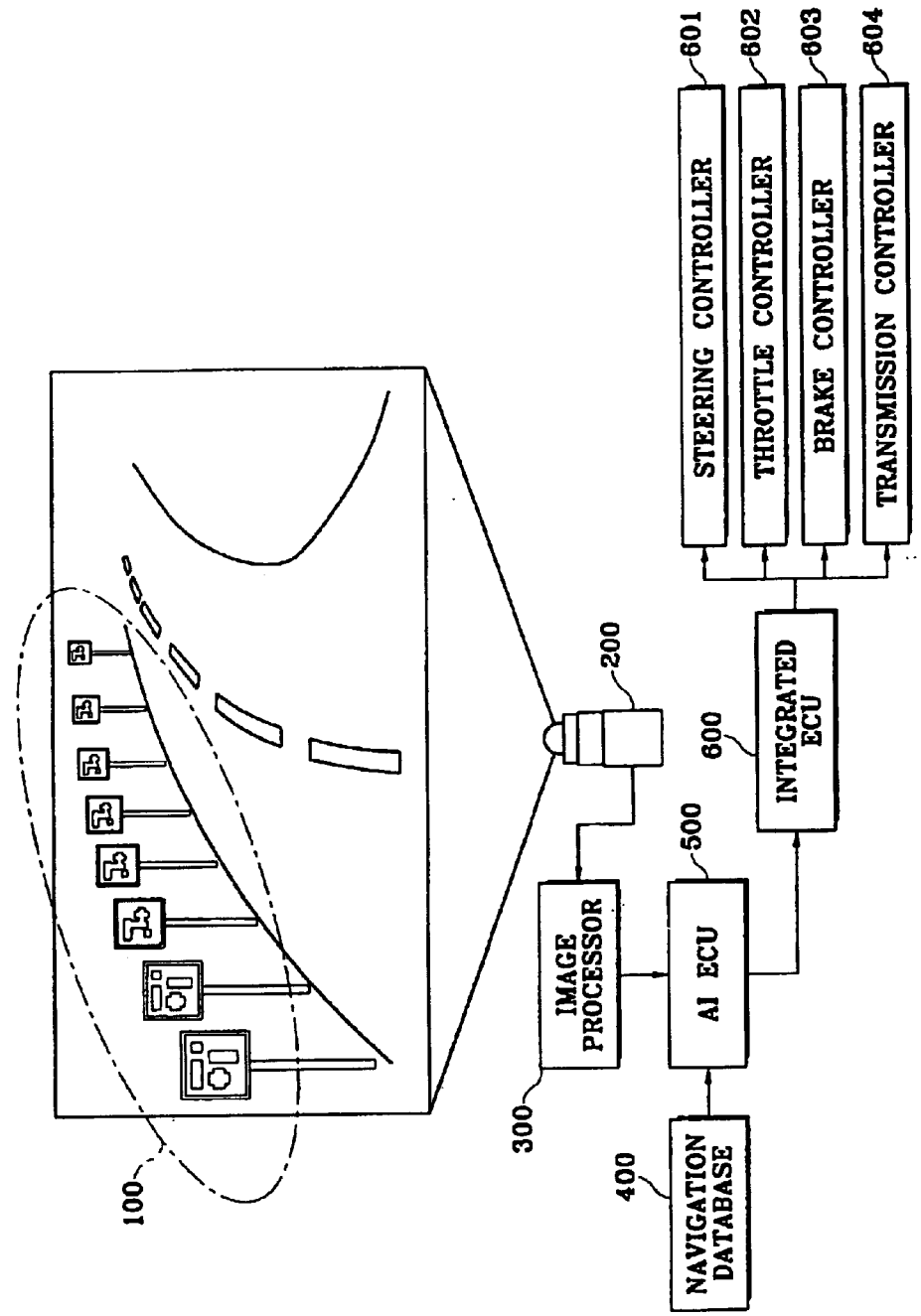
FIG. 1 is a block diagram illustrating an exemplary self-control traveling system for an expressway in accordance with an embodiment of the present invention.

Referring to FIG. 1, the self-control traveling system includes an imaging device, preferably a digital device such as a charge coupled device (CCD) camera 200, an image processor 300, a navigation database 400, an artificial intelligence-electronic control unit (AI ECU) 500 and an integrated ECU 600. A plurality of road signs 100 maybe specifically installed as part of the system, or the system may be configured to utilize existing road signs in whole or in part. The road signs 100 preferably are consecutively installed at the left or right side of the expressway. The imaging device 200, which may be located for example in the rear-view mirror, photographs the road signs 100 installed along the express. The image processor 300 analyzes at least one image inputted from the imaging device 200, discriminates the road signs 100 and reads the sign contents of the road signs 100. The navigation database 400 stores the map information of the expressway. The AI ECU 500 determines a current position and a road state on the basis of the map information stored in the navigation database 400 and the sign contents read by the image processor 300. The integrated ECU 600 selectively controls steering operation, speed increment/decrement operation and brake operation associated with a self-control traveling operation by controlling a steering controller 601, a throttle controller 602, a brake controller 603 and a transmission controller 604 according to the result of determinations inputted from the AI ECU 500.

Image processor 300, AI ECU 500 and ECU 600 each may comprise a processor, memory and associated hardware and software as may be selected and programmed by persons of ordinary skill in the art based on the teachings herein contained. Database 400 may comprise separate memory and hardware specifically programmed for database operations as is understood by persons skilled in the art.

Furthermore, the road signs 100 preferably include graphic forms configured by combinations of specified signs simply indicating the current road states capable of being easily analyzed by the image processor 30. Here, the road signs 100 include information associated with a starting, end and turning point of the expressway, and information associated with a curvature, speed limit and number of lanes at a current position in the expressway.

Operation in accordance with a preferred embodiment of the present invention will now be described.

Figure 2:
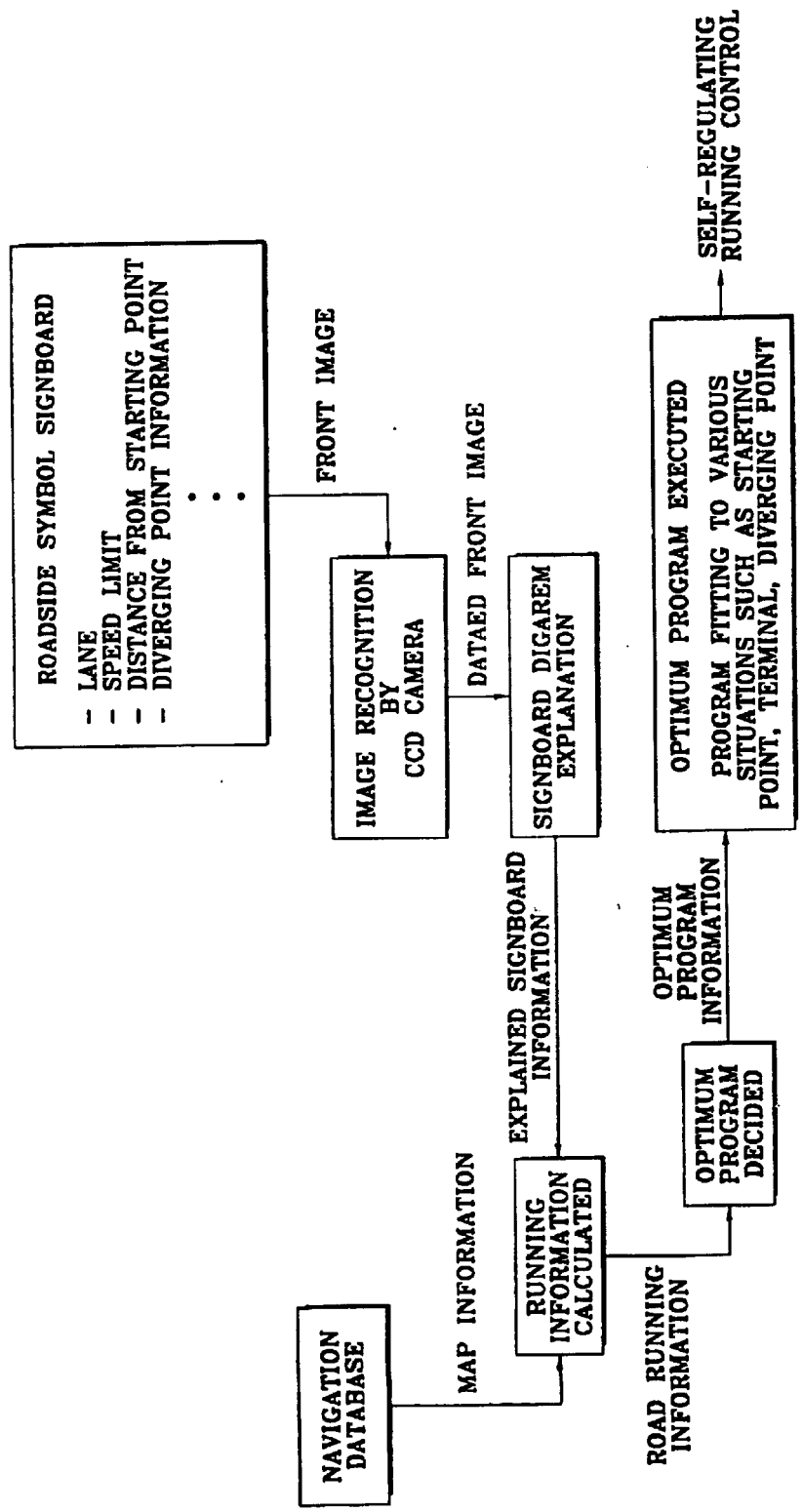
FIG. 2 is a block diagram illustrating operations of system elements in accordance with an embodiment of the present invention.

Referring to FIGS. 2 and 3, if at least one image associated with the road signs 100 among images inputted from the imaging device 200 is received when an automobile goes through an expressway tollgate during a manual driving operation, the image processor 300 determines, at step S100, whether the received image contains information indicating a starting point for enabling a self-control traveling operation.

If the received image contains information indicating the starting point for enabling the self-control traveling operation, the AI ECU 500 notifies a driver that the self-control traveling operation can be started at step S101, and determines whether a self-control traveling command is inputted at step S102. If the self-control traveling command is not inputted by the driver during a predetermined time (e.g., 10 seconds), the automobile maintains the manual driving operation at step S103.

If the self-control traveling command is inputted as a result of the determination at the above step S102, the AI ECU 500 switches from a manual driving mode to an automatic driving mode, request that the driver input destination information, and starts the self-control traveling operation at step S104.

If the destination information is inputted from the driver at the above step S104, the AI ECU 500 reads and searches for map information associated with the inputted destination information from the navigation database 400 and determines whether a turning point is indicated in the searched information at step S105.

If a turning point is indicated in the searched information as a result of the determination at the above step S105, the AI ECU 500 performs the self-control traveling operation on the basis of input image information and determines whether the turning-point information is inputted among the input image information during the self-control traveling operation at step S106.

If the automobile has arrived at the turning point as a result of the determination, the AI ECU 500 notifies the integrated ECU 600 that the automobile has arrived at the turning point, and the integrated ECU 600 controls the steering controller 601, etc., so that an automatic steering operation can be performed and a traveling route can be changed to the turning point at step S107.

After the above step S107 is completed, the AI ECU 500 notifies the driver that a section of the self-control traveling operation will end soon when the automobile gets near to the destination according to a result of a sign image analysis performed by the image processor 300, and determines whether a sign image indicating an end point is contained in the image information inputted through the image processor 300 at step S108. On the other hand, if no turning point is indicated in the searched information as the result of the determination at the above step S105, the above step S108 is performed.

If the automobile arrives at the end point as a result of the determination at the above S108, the driving mode is switched from the automatic driving mode to the manual driving mode and the self-control traveling operation is terminated at step S109. The driver is notified that the self-control traveling operation is terminated at the above step S109. A mode switching time-point is a point in time when the automobile arrives at a tollgate located at the end point and is stopper The automatic driving mode is switched to the manual driving mode at the mode switching time-point.

As apparent from the above description, the present invention provides a self-control traveling system for an expressway and a method for controlling the same, which can improve convenience to a driver, reduce the driver's stress due to an expressway driving operation and improve reliability of an automatic driving operation.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for controlling a self-control traveling system for an expressway, comprising:

(a) determining whether at least one image received from an imaging device contains information indicating a starting point for enabling a self-control traveling operation;

(b) determining whether a self-control traveling command is inputted according to a result of the determination at the step (a), switching a driving mode from a manual driving mode to an automatic driving mode, requesting that destination information be inputted, and starting the self-control traveling operation;

(c) searching for corresponding map information associated with the inputted destination information when the self-control traveling operation is started, determining whether a turning point is indicated in the searched man information, and performing the self-control traveling operation according to a result of the determination;

(d) determining whether turning-point information is inputted among input image information during the self-control traveling operation;

(e) controlling an automatic turning operation or determining whether an automobile has arrived at an end point according to a result of the determination at the step (d); and (f) switching the driving mode from the automatic driving mode to the manual driving mode according to a result of the determination at the step (e), and terminating the self-control traveling operation, wherein step (e) comprises:

(e-1) changing a traveling route to the turning point when the automobile arrives at the turning point;

(e-2) notifying the driver that a section of the self-control traveling operation will end soon when the automobile gets near to the destination during searching for the map information after step (e-1) is completed; and (e-3) determining whether a sign image indicating the end point is contained in the input image information after step (e-2) is completely performed.

2. A method for controlling a self-control traveling system for an expressway, comprising:

(a) determining whether at least one image received from an imaging device contains information indicating a starting point for enabling a self-control traveling operation;

(b) determining whether a self-control traveling command is inputted according to a result of the determination at the step (a), switching a driving mode from a manual driving mode to an automatic driving mode, requesting that destination information be inputted, and starting the self-control traveling operation;

(c) searching for corresponding map information associated with the inputted destination information when the self-control traveling operation is started, determining whether a turning point is indicated in the searched man information, and performing the self-control traveling operation according to a result of the determination;

(d) determining whether turning-point information is inputted among input image information during the self-control traveling operation;

(e) controlling an automatic turning operation or determining whether an automobile has arrived at an end point according to a result of the determination at the step (d); and (f) switching the driving mode from the automatic driving mode to the manual driving mode according to a result of the determination at the step (e), and terminating the self-control traveling operation, wherein step (f) is carried out by switching the driving mode from the automatic driving mode to the manual driving mode when the automobile arrives at a site located at the end point and the automobile is stopped.

* * * * *